United States Patent [19]
Aldrich

[11] Patent Number: 5,477,637
[45] Date of Patent: Dec. 26, 1995

[54] FLORAL BOUQUET STEM SEPARATOR

[75] Inventor: Jay L. Aldrich, Miami, Fla.

[73] Assignee: XL Group, Inc., Miami, Fla.

[21] Appl. No.: 328,487

[22] Filed: Oct. 25, 1994

[51] Int. Cl.⁶ .............................. A01G 5/00; A47G 7/00
[52] U.S. Cl. ................ 47/41.01; 47/41.11; 47/41.13
[58] Field of Search ..................... 47/41.11, 41.13, 47/41.01

[56] References Cited

U.S. PATENT DOCUMENTS

| 1,491,926 | 4/1924 | Rosenwald | 47/41.11 |
| 1,775,250 | 9/1930 | Link | 47/41.13 |
| 1,892,393 | 12/1932 | Halm | 47/41.13 |
| 3,767,104 | 10/1973 | Bachman et al. | 47/41.11 |
| 4,224,763 | 9/1980 | Prindle | 47/41.11 |

FOREIGN PATENT DOCUMENTS

| 586154 | 11/1959 | Canada | 47/41.11 |
| 1157567 | 5/1958 | France | 47/41.13 |
| 558773 | 5/1931 | Germany | 47/41.13 |
| 7942 | of 1905 | United Kingdom | 47/41.11 |
| 111990 | 12/1917 | United Kingdom | 47/41.11 |
| 344032 | 3/1931 | United Kingdom | 47/41.11 |

*Primary Examiner*—Terry Lee Melius
*Assistant Examiner*—Joanne C. Downs
*Attorney, Agent, or Firm*—Lieberman & Nowak

[57] ABSTRACT

The invention provides a system comprising a separator device used in conjunction with a tying device to hold flowers in a bouquet in a manner so as to make the bouquet larger and seem fuller and more voluminous. The separator of the invention separates the floral stems and forces them outwardly by means of angled holes. The tying device holds the stems of the flowers together at a point below the separator. The overall effect is that the flowers of the bouquet are held in a position so that the top of the bouquet is larger than standard bouquets.

8 Claims, 4 Drawing Sheets

FLORAL BOUQUET STEM SEPARATOR

BACKGROUND OF THE INVENTION

The invention relates to a system comprising a separator and tying device which is useful on floral bouquets to enhance their appearance and to aid in their shipment and display. The invention also relates to a method that incorporates the use of the disclosed separator and tying device, and which enhances the visual appearance of pre-manufactured floral bouquets by making the bouquets fuller, larger and more visually appealing.

The fresh floral bouquet manufacturers have been criticized for the looks of the pre-manufactured floral bouquets sold at the retail level in the mass market. Bouquets usually look as if they have been squeezed together at the heads and show no signs of any design criteria. Currently, the desired procedure of floral bouquet distribution is to have the bouquets manufactured at the growers level (e.g., in South America). In order to maximize the number of bouquets in a shipping carton, the bouquets are packed very tightly and arrive at the store looking crushed and compacted.

One attempt to overcome this problem is to pack the bouquets in a water-packed system, instead of packing them dry. When bouquets are shipped in water, they have a tendency to begin the process of opening or developing to their full size, which in some cases overcomes the crushed, compacted look. This shipping method, however, is not desirable when the distribution chain is long because the longer the flowers are in water, the less total time the retailer will have to display the bouquets and the consumer will have for the use of the product. Furthermore, the water-packed shipping method increases the chance that disease or fungi will develop in the flowers.

The present invention overcomes the crushed, compacted look of bouquets packed in accordance with the prior art, and avoids the loss of usage time associated with water-packed bouquets. The invention accomplishes this by packing the bouquets in a dry state but in a manner (and using a system) which make the bouquets appear larger and more voluminous.

SUMMARY OF THE INVENTION

The invention provides a system comprising a separator device used in conjunction with a tying device to hold flowers in a bouquet in a manner so as to make the bouquet larger and seem fuller and more voluminous. The separator of the invention separates the floral stems and forces them outwardly by means of angled holes. The tying device holds the stems of the flowers together at a point below the separator. The overall effect is that the flowers of the bouquet are held in a position so that the top of the bouquet is larger than standard dry-packed or water-packed bouquets.

In the preferred embodiments of the invention, the separator is placed four to five inches from the bottoms or ends of the stems and the tying device is placed approximately an inch from the bottoms or ends of the stems.

DETAILED DESCRIPTION OF THE INVENTION

Figure 3A:
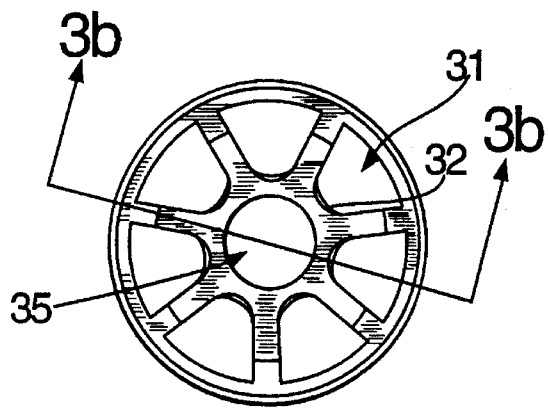
FIGS. 3a, b, c, d, and e illustrate the separator in a bottom view, sectional view, side view, top view and side view, respectively.
Figure 3B:
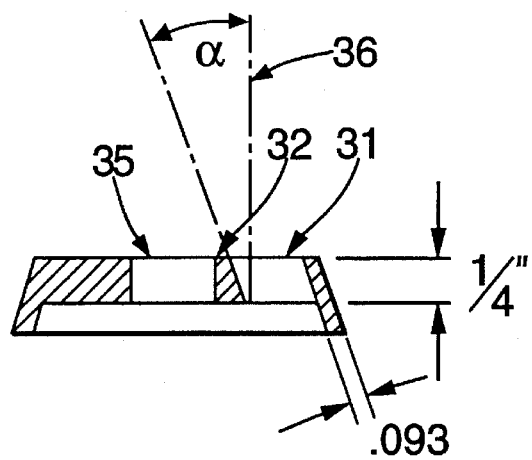
FIG. 3 shows the bouquet separator of the present invention.
Figure 3D:
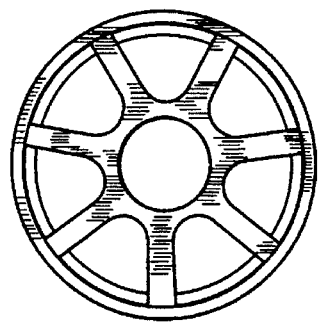
Figure 3C:
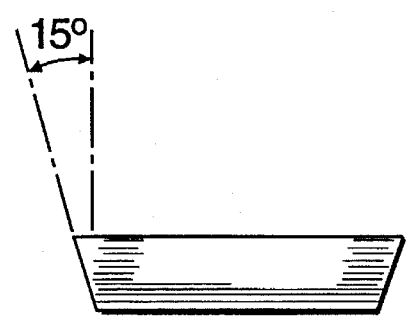
Figure 3E:
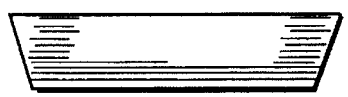

The present invention relates to a system comprising a separator and tying device which is useful on floral bouquets to enhance their appearance and to aid in their shipment and display. The separator is made out of a water-proof material and hard enough to withstand the pressure of the stems forcing on the outer walls of the separator. Suitable material includes metal, plastic, coated cardboard impervious to water, etc. Preferably, the separator is made from a plastic material. The thickness of the separator is bound by manufacturing systems, wherein thinner thicknesses are preferred. In the embodiments illustrated in the figures, the separator has a thickness of approximately ⅜ of an inch. See FIG. 3e.

Stem holes are provided in the separator to hold the stems of the flowers in the bouquet (see e.g., 31 and 35 in FIG. 3). The holes are typically uniformly dispersed across the separator with those in the outer portion of the separator (e.g., 31 in FIG. 3) having at least a portion of the inner or circumferential walls forming the holes at an angle with respect to an axis perpendicular to the top or bottom surface of the separator (see $\alpha$ in FIG. 3b). The angling of the circumferential walls of the holes in the outer portion of the separator forces the floral stems into an outward position. There is also one or several holes in the center of the separator (35 in FIG. 3) which may or may not be angled. These holes facilitate the vertical positioning of center flowers. Accordingly, holes for the flower stems are formed in the separator at an angle of 0° or nearly 0° for the center holes (see e.g., 35 in FIG. 3) and at an angle of less than 90°, preferably less than 45°, for the remaining holes on the outer portion of the separator (see e.g., 31 in FIG. 3); the measured angle referring to the angle formed by the circumferential walls of the holes and an axis perpendicular to the top or bottom surface of the separator (see e.g., FIG. 3b, axis 36, wall 32 and angle $\alpha$). In the preferred embodiment shown in FIG. 3, the inner or circumferential walls 32 of the stem holes 31 in the outer portions of the separator are formed at angle $\alpha$ of approximately 15° to 20° in order to force the flower stems in an outward position. Additionally, as shown in FIG. 3, the inner or circumferential walls 32 are rounded to prevent the separator from cutting into or damaging the stems of the flowers. The number of stem holes in the separator varies depending upon the number of stems in the bouquet.

It is contemplated that a bouquet manufacturer will utilize the separator of the present invention by manually placing each stem down through an opening of the separator. The separator will then be placed approximately 4 to 5 inches from the base or end of the stems and shall act as a fulcrum to force the tops of the stems apart. A tying device is placed approximately one inch from the base or ends of the stems, or 3 or 4 inches below the separator, and is used to bind the loose bottom ends of the stems together. Tying devices are well known to those skilled in the art and include string, plastic or metal strips, twist ties, expandable elastic bands, rubberbands, and the like.

Using the present invention, the top of a normal seven stem bouquet will be increased in diameter from approximately 6 inches to approximately 9 to 12 inches or more. It is contemplated that the separator and tying device of the present invention will be used during shipment and display of the bouquets and also may be left in place by the consumer in order to give the bouquet a fuller presentation in the consumer's vase. During shipment and display, the invention may be used alone or in conjunction with other means, such as standard floral sleeves, to prevent the crushed and compacted look normally associated with bouquets shipped in accordance with prior art methods.

Figure 1:
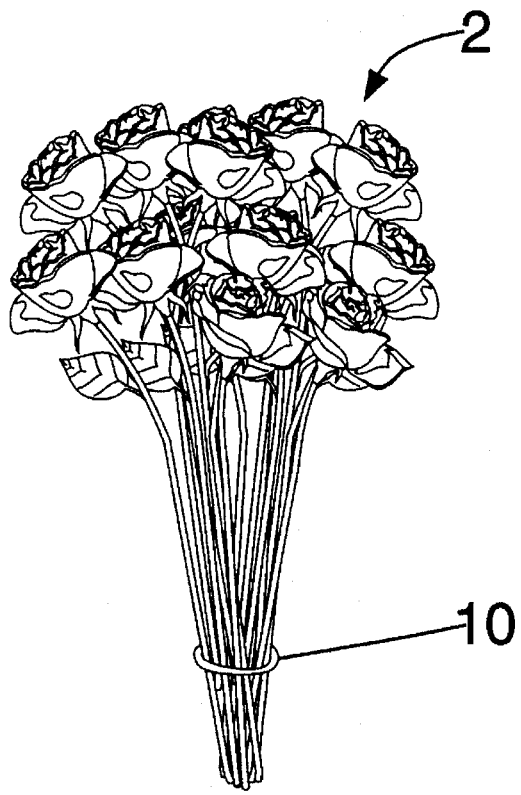
FIG. 1 shows a floral bouquet manufactured without the use of the present invention.
Figure 2:
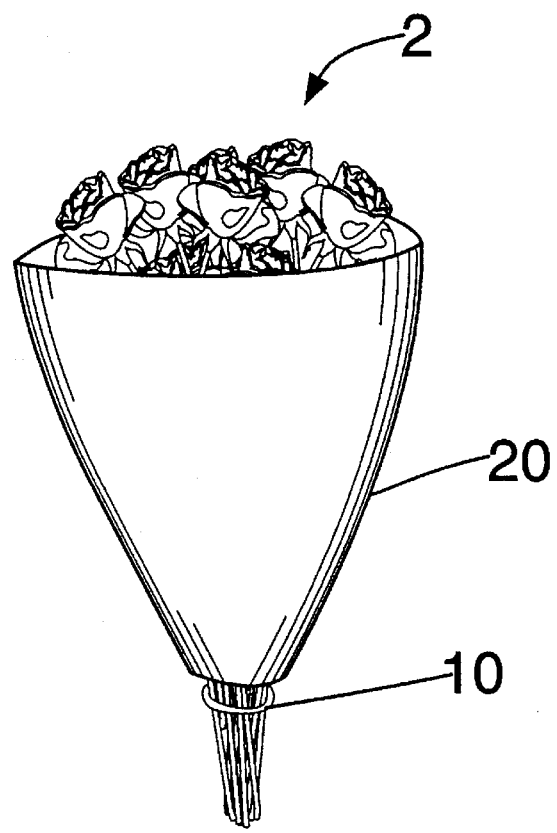
FIG. 2 shows the bouquet of FIG. 1 placed within a floral sleeve.

Turning now to the figures, as shown in FIG. 1, a currently manufactured bouquet with rubberband 10 is tied so that at the top of the bouquet the petals (2) of the various flowers are touching. FIG. 2 shows a currently manufactured bouquet within floral sleeve 20. Note that the sleeve has a tendency to force the flowers together further making the appearance even tighter and more compact.

Figure 4:
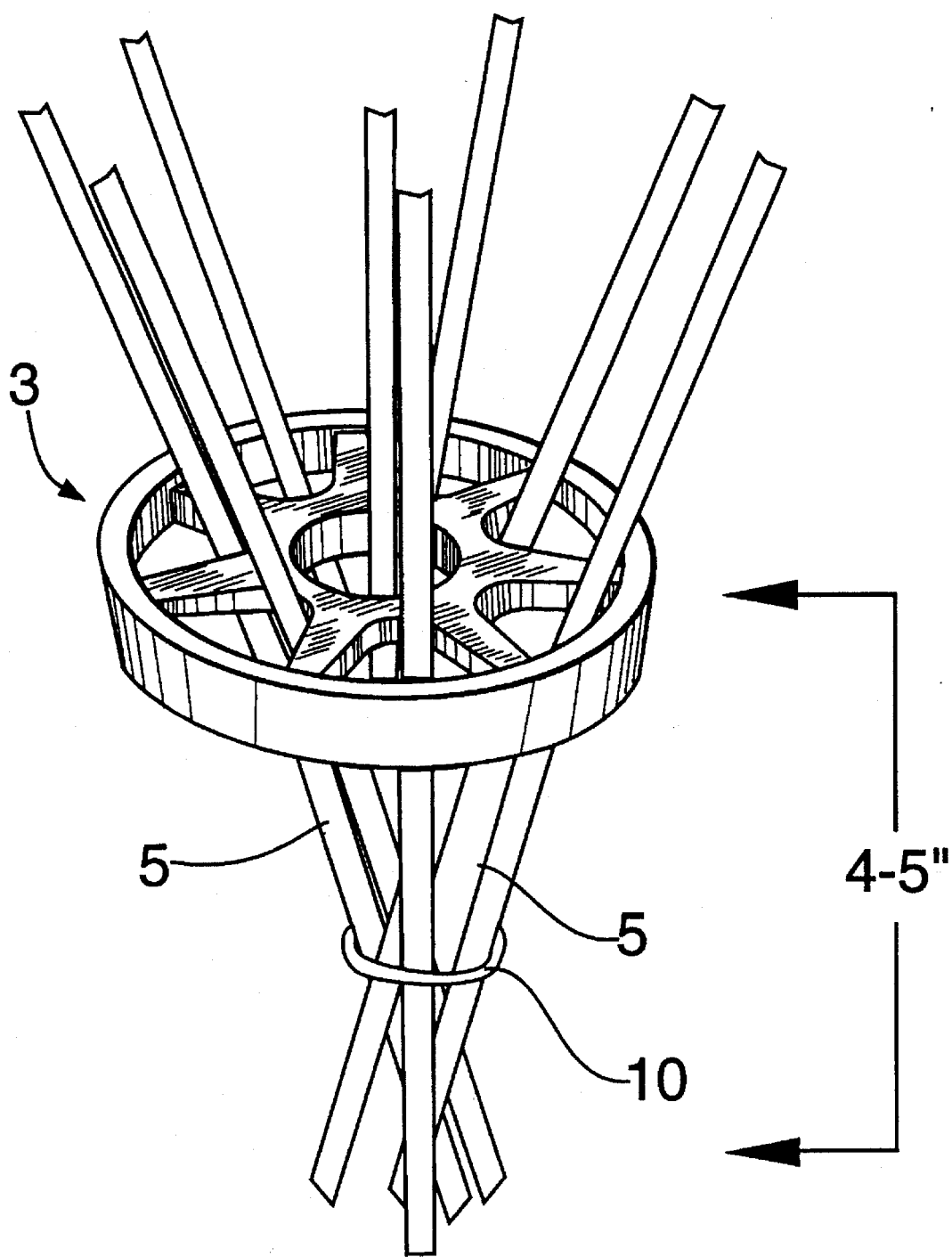
FIG. 4 shows the placement of the separator and the tying device on the flower stems.
Figure 5:
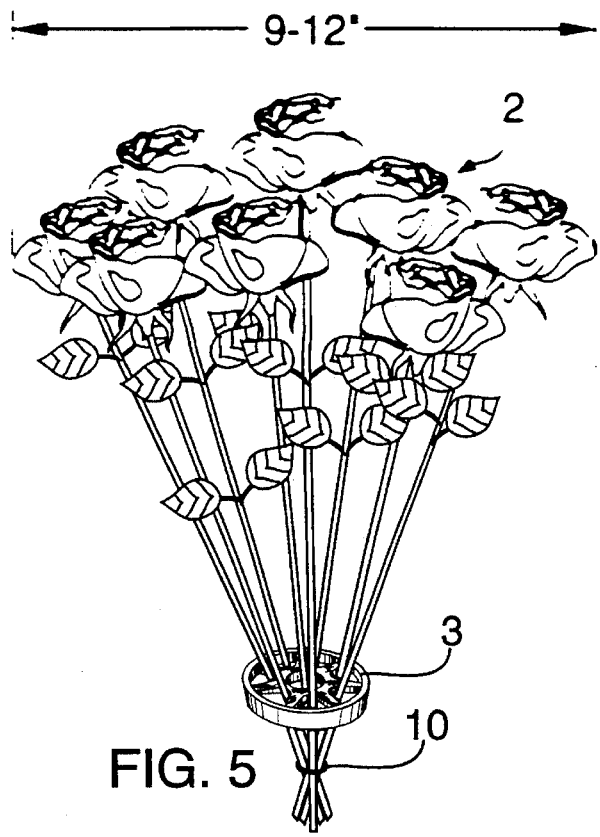
FIG. 5 shows a floral bouquet using the present invention.
Figure 6:
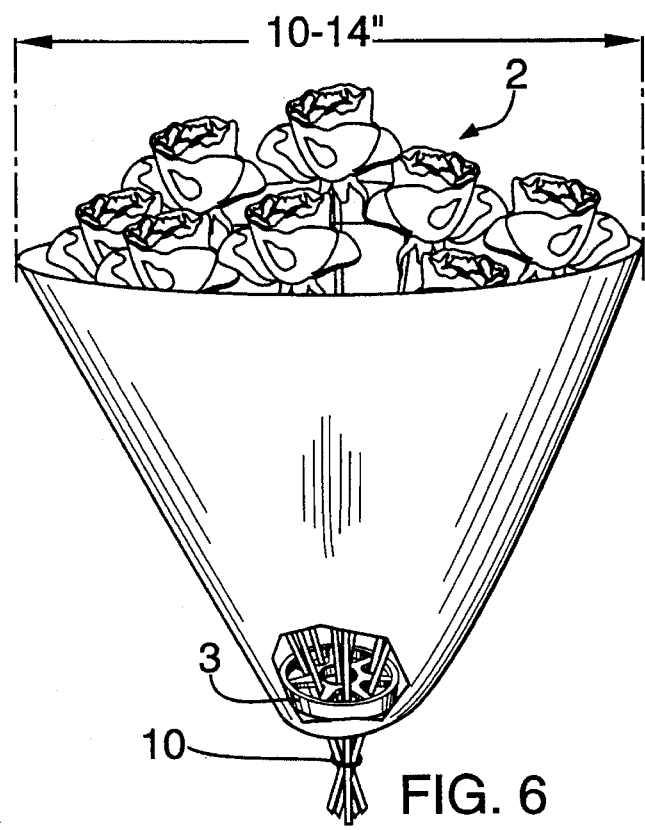
FIG. 6 shows the bouquet of FIG. 5 placed within a floral sleeve.

The separator of the present invention is shown in FIG. 3. In FIG. 4, the separator (3) is shown in relation to the bottom of the stems (5) and the tying device (10). It should be understood that the higher or lower the separator is placed on the stems will affect the degree of opening of the flower arrangement. The lower the separator is placed with respect to the ends of the stems, the larger the diameter of the top floral arrangement. FIG. 5 shows the effect of the floral bouquet when utilizing the present invention. FIG. 6 shows the bouquet of FIG. 5 placed within a floral sleeve (20). Note that the sleeve in FIG. 6 and the appearance of the bouquet is much larger than the currently used commercial bouquets and sleeves.

It will become apparent to those skilled in the art upon a reading of this disclosure that modifications and equivalents of the elements and devices shown herein may be employed in practice in this invention. These modifications and equivalents are considered to be within the spirit and scope of the present invention. The examples, figures and descriptions set forth herein are presented to aid in an understanding of the invention and are not intended to, and should not be construed to, limit the invention in any manner. The invention shall only be limited by the scope of claims presented herein.

What is claimed is:

1. A system for retaining flowers in a bouquet which comprises:

i) a separator having a top surface, a bottom surface, a center portion and an outer edge portion and defining a plurality of holes dispersed throughout capable of holding one or more stems of the flowers in the bouquet, the holes in the outer edge portion having at least part of their circumferential walls tapered at an angle greater than 0° and less than approximately 45° from an axis perpendicular to the top or bottom surfaces of the separator; and ii) a tying device.

2. A system of claim 1 wherein the circumferential walls of the holes in the outer edge portion are tapered at a 20° angle.

3. A system of claim 1 wherein the tying device is an expandable elastic band, a rubberband, or a twist tie.

4. A method of retaining flowers for display or shipping which comprises:

(i) placing the flowers in a separator having a top surface, a bottom surface, a center portion and an outer edge portion and defining a plurality of holes dispersed throughout capable of holding one or more stems of the flowers, the holes in the outer edge portion having at least part of their circumferential walls tapered at an angle greater than 0° and less than approximately 45° from an axis perpendicular to the top or bottom surfaces of the separator;

ii) positioning the separator on the flower stems so that it is approximately 4 to 5 inches from the bottom of the stems; and iii) placing a tying device around the stems at a position of approximately 1 inch from the bottom of the stems.

5. A method of claim 4 wherein the circumferential walls of the holes in the outer edge portion are tapered at a 20° angle.

6. A method of claim 4 wherein the tying device is an expandable elastic band, a rubberband, or a twist tie.

7. A separator for use in displaying or shipping flower bouquets which comprises a round plastic disk less than six inches in diameter and having a plurality of holes dispersed throughout, the disk having top and bottom surfaces and a center portion and an outer edge portion, the holes in the outer edge portion having at least part of their circumferential walls tapered at an angle greater than 0° and less than approximately 45° from an axis perpendicular to the top or bottom surfaces of the disk.

8. A separator of claim 7 wherein the circumferential walls of the holes in the outer edge portion are tapered at a 20° angle.

* * * * *